(12) United States Patent
Hussain et al.

(10) Patent No.: US 9,237,581 B2
(45) Date of Patent: Jan. 12, 2016

(54) APPARATUS AND METHOD FOR MEDIA ACCESS CONTROL SCHEDULING WITH A SORT HARDWARE COPROCESSOR

(71) Applicant: Cavium, Inc., San Jose, CA (US)

(72) Inventors: Muhammad Raghib Hussain, Saratoga, CA (US); Vishal Murgai, Cupertino, CA (US)

(73) Assignee: Cavium, Inc., San Jose, CA (US)

( * ) Notice: Subject to any disclaimer, the term of this patent is extended or adjusted under 35 U.S.C. 154(b) by 247 days.

(21) Appl. No.: 13/830,395

(22) Filed: Mar. 14, 2013

(65) Prior Publication Data

US 2014/0269529 A1   Sep. 18, 2014

(51) Int. Cl.
*H04W 72/12* (2009.01)
*H04L 12/851* (2013.01)
*H04W 28/02* (2009.01)

(52) U.S. Cl.
CPC ....... *H04W 72/1247* (2013.01); *H04L 47/2433* (2013.01); *H04L 47/2441* (2013.01); *H04W 72/1242* (2013.01); *H04W 28/0289* (2013.01)

(58) Field of Classification Search
None
See application file for complete search history.

(56) References Cited

U.S. PATENT DOCUMENTS

| | | | | |
|---|---|---|---|---|
| 5,193,207 | A * | 3/1993 | Vander Vegt et al. | 1/1 |
| 6,175,554 | B1 * | 1/2001 | Jang et al. | 370/229 |
| 6,466,976 | B1 * | 10/2002 | Alles et al. | 709/224 |
| 6,665,752 | B1 * | 12/2003 | Bernath et al. | 710/52 |
| 6,721,797 | B1 * | 4/2004 | Kim | 709/232 |
| 6,845,389 | B1 * | 1/2005 | Sen et al. | 709/204 |
| 7,035,277 | B1 * | 4/2006 | Batcher | 370/447 |
| 7,080,400 | B1 * | 7/2006 | Navar | 725/139 |
| 7,698,366 | B2 * | 4/2010 | Schofield et al. | 709/205 |
| 8,266,150 | B1 | 9/2012 | Lin et al. | |
| 2002/0097695 | A1 * | 7/2002 | Herrmann | 370/329 |
| 2002/0191592 | A1 * | 12/2002 | Rogers et al. | 370/352 |
| 2003/0035371 | A1 * | 2/2003 | Reed et al. | 370/230 |
| 2003/0037117 | A1 * | 2/2003 | Tabuchi | 709/207 |
| 2003/0063562 | A1 * | 4/2003 | Sarkinen et al. | 370/230 |
| 2003/0067903 | A1 * | 4/2003 | Jorgensen | 370/338 |
| 2003/0081611 | A1 * | 5/2003 | Goetzinger et al. | 370/395.4 |
| 2003/0096617 | A1 * | 5/2003 | Miller, II et al. | 455/452 |
| 2003/0161340 | A1 * | 8/2003 | Sherman | 370/445 |
| 2004/0158646 | A1 * | 8/2004 | Miernik et al. | 709/249 |
| 2005/0135312 | A1 * | 6/2005 | Montojo et al. | 370/335 |
| 2007/0121542 | A1 * | 5/2007 | Lohr et al. | 370/329 |
| 2008/0046266 | A1 * | 2/2008 | Gudipalley et al. | 705/1 |
| 2008/0065442 | A1 | 3/2008 | Bayer et al. | |
| 2008/0310301 | A1 * | 12/2008 | Wade et al. | 370/230 |
| 2009/0044189 | A1 * | 2/2009 | Mutlu et al. | 718/102 |
| 2009/0103438 | A1 * | 4/2009 | Groh et al. | 370/235 |
| 2009/0138670 | A1 * | 5/2009 | Mutlu et al. | 711/167 |
| 2009/0175226 | A1 * | 7/2009 | Ren et al. | 370/329 |
| 2010/0195503 | A1 * | 8/2010 | Raleigh | 370/235 |
| 2010/0248771 | A1 * | 9/2010 | Brewer et al. | 455/518 |
| 2010/0281483 | A1 | 11/2010 | Rakib et al. | |
| 2010/0306460 | A1 | 12/2010 | Hara | |
| 2011/0085512 | A1 * | 4/2011 | Lin et al. | 370/329 |
| 2011/0126079 | A1 * | 5/2011 | Wu et al. | 714/763 |
| 2011/0179240 | A1 * | 7/2011 | Sukonik et al. | 711/158 |
| 2011/0296117 | A1 | 12/2011 | Fukuda et al. | |
| 2012/0202513 | A1 * | 8/2012 | Ericson et al. | 455/452.2 |

(Continued)

*Primary Examiner* — Bunjob Jaroenchonwanit

(74) *Attorney, Agent, or Firm* — Cooley LLP

(57) ABSTRACT

An apparatus includes a Media Access Control (MAC) scheduler to generate a sort request. A hardware based sort coprocessor services the sort request in accordance with specified packet processing priority parameters to generate a sorted array.

8 Claims, 3 Drawing Sheets

(56) References Cited

U.S. PATENT DOCUMENTS

| | | |
|---|---|---|
| 2012/0271922 A1* | 10/2012 | Assouline et al. ............ 709/219 |
| 2012/0307807 A1* | 12/2012 | Kashiwase .................... 370/336 |
| 2013/0003680 A1* | 1/2013 | Yamamoto et al. ........... 370/329 |
| 2013/0044028 A1 | 2/2013 | Lea et al. |
| 2013/0189994 A1 | 7/2013 | Maehara et al. |
| 2014/0204740 A1* | 7/2014 | Tokutsu et al. ............... 370/230 |
| 2015/0172130 A1* | 6/2015 | Colla et al. .................... 709/223 |

* cited by examiner

APPARATUS AND METHOD FOR MEDIA ACCESS CONTROL SCHEDULING WITH A SORT HARDWARE COPROCESSOR

FIELD OF THE INVENTION

This invention relates generally to mobile wireless communication systems. More particularly, this invention relates to a mobile wireless communication node with media access control scheduling utilizing a sort hardware coprocessor.

BACKGROUND OF THE INVENTION

A mobile wireless communication system processes packet data to satisfy specified quality of service parameters. The quality of service parameters may include bit error rate, packet latency, service response time, packet loss rate, signal-to-noise ratio and the like. Prioritizing packet transfers is a complex and critical task. Accordingly, there is a need to improve existing techniques for prioritizing traffic in mobile wireless communication systems.

SUMMARY OF THE INVENTION

An apparatus includes a Media Access Control (MAC) scheduler to generate a sort request. A hardware based sort coprocessor services the sort request in accordance with specified packet processing priority parameters to generate a sorted array.

A network node includes Layer-1 functional blocks and Layer-2 functional blocks including a Media Access Control (MAC) scheduler program executed on a processor to generate a sort request, and a hardware based sort coprocessor to service the sort request in accordance with specified packet processing priority parameters to generate a sorted array.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 1:
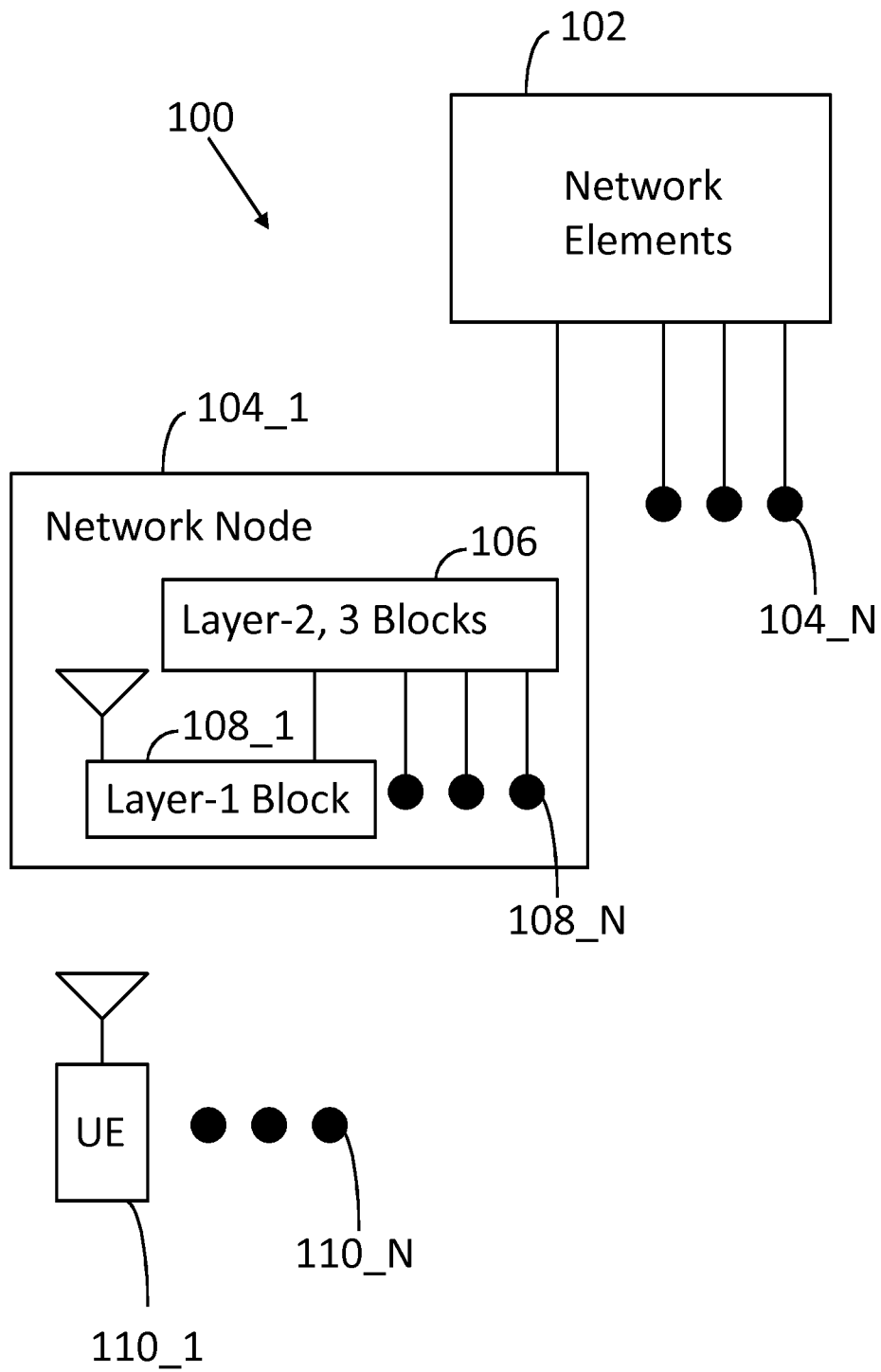
FIG. 1 illustrates a system configured in accordance with an embodiment of the invention.

FIG. 1 illustrates a system 100 configured in accordance with an embodiment of the invention. The system 100 includes network elements 102, which coordinate communications for a set of network nodes 104_1 through 104_N. By way of example, the network elements 102 may include Mobility Management Entities (MMES), Serving Gateways (S-GWs), Packet Data Network Gateways (P-GWs) and the like. The network node 104 may be hardware that is connected to a mobile phone network to communicate directly with user equipment 110_1 through 110_N (e.g., mobile handsets).

The network node 104 may be an Evolved Node B (also referred to as eNB, eNodeB or E-UTRAN Node B). Evolved Node B is the element in the Evolved Universal Terrestrial Radio Access (E-UTRA) of Long Term Evolution (LTE) that is the evolution of the element Node B in Universal Terrestrial Radio Access (UTRA) of the Universal Mobile Telecommunications System (UMTS). Evolved Node B is the hardware that is connected to the mobile phone network that communicates directly with mobile handsets (e.g., UEs 110), like a base transceiver station (BTS) in GSM networks. Traditionally, a Node B has minimum functionality, and is controlled by a Radio Network Controller (RNC). However, with an eNodeB, there is no separate controller element. This simplifies the architecture and allows lower response times.

Node 104 includes Layer-2 and Layer-3 functional blocks 106. These blocks may include Packet Data Convergence Protocol (PDCP) blocks, Radio Link Control (RLC) blocks, MAC blocks and the like. Functional blocks 106 communicate with Layer-1 blocks 108_1 through 108_N. The Layer-1 blocks are Layer-1 physical layer functional blocks that communicate with the user equipment (e.g., mobile devices) 110_1 through 110_N. The Layer-1 blocks establish a duplex communication path (e.g., frequency division duplex communications or time division duplex communications) with user equipment. The communication path is a packet channel, where each packet may have speech, data, picture or video information.

Figure 2:
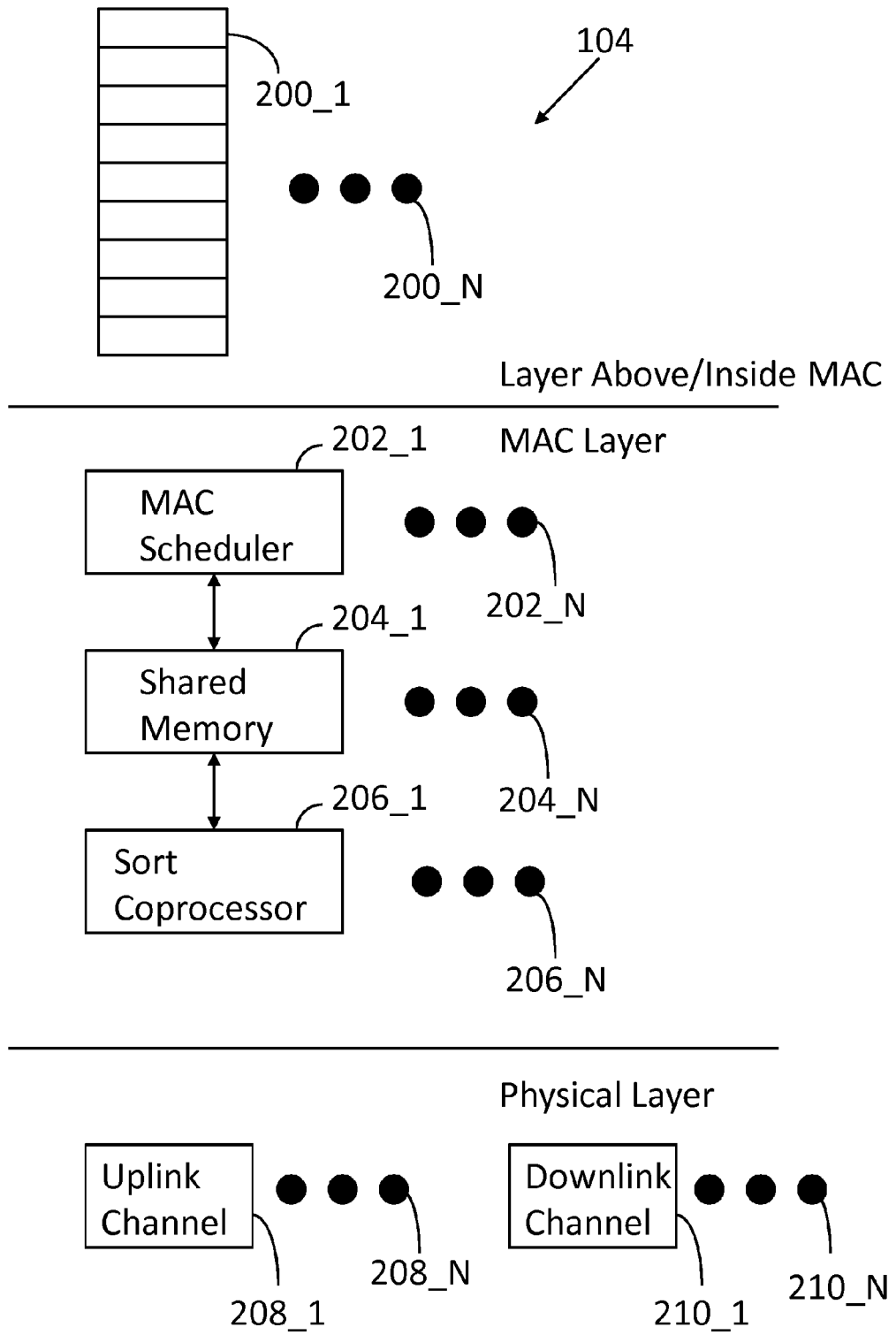
FIG. 2 illustrates a node configured in accordance with an embodiment of the invention.

FIG. 2 is a more detailed characterization of a node 104 configured in accordance with an embodiment of the invention. The node includes a number of queues 200_1 through 200_N for storing packet communications. The queues 200 reside above or at the media access layer (e.g., network layer, transport layer).

The media access layer includes MAC schedulers 202_1 through 202_N. Each MAC scheduler 202 is a software process or thread executing on a processor. Shared memories 204_1 through 204_N and sort coprocessors 206_1 through 206_N also reside at the MAC layer.

Each MAC scheduler 202 generates requests for user data sorted by priority. In one embodiment, a sort request is written to shared memory 204. The sort coprocessor 206 notes the write operation and initiates operations to generate a sorted array. More particularly, the sort coprocessor services the user sort request in accordance with specified user processing priority parameters to generate a sorted array of sorted users. The MAC scheduler 202 retrieves the sorted array, loads it into a media access control block and applies the block to one of the downlink channels 210_1 through 210_N or uplink channels 208_1 through 208_N of the physical layer.

Figure 3:
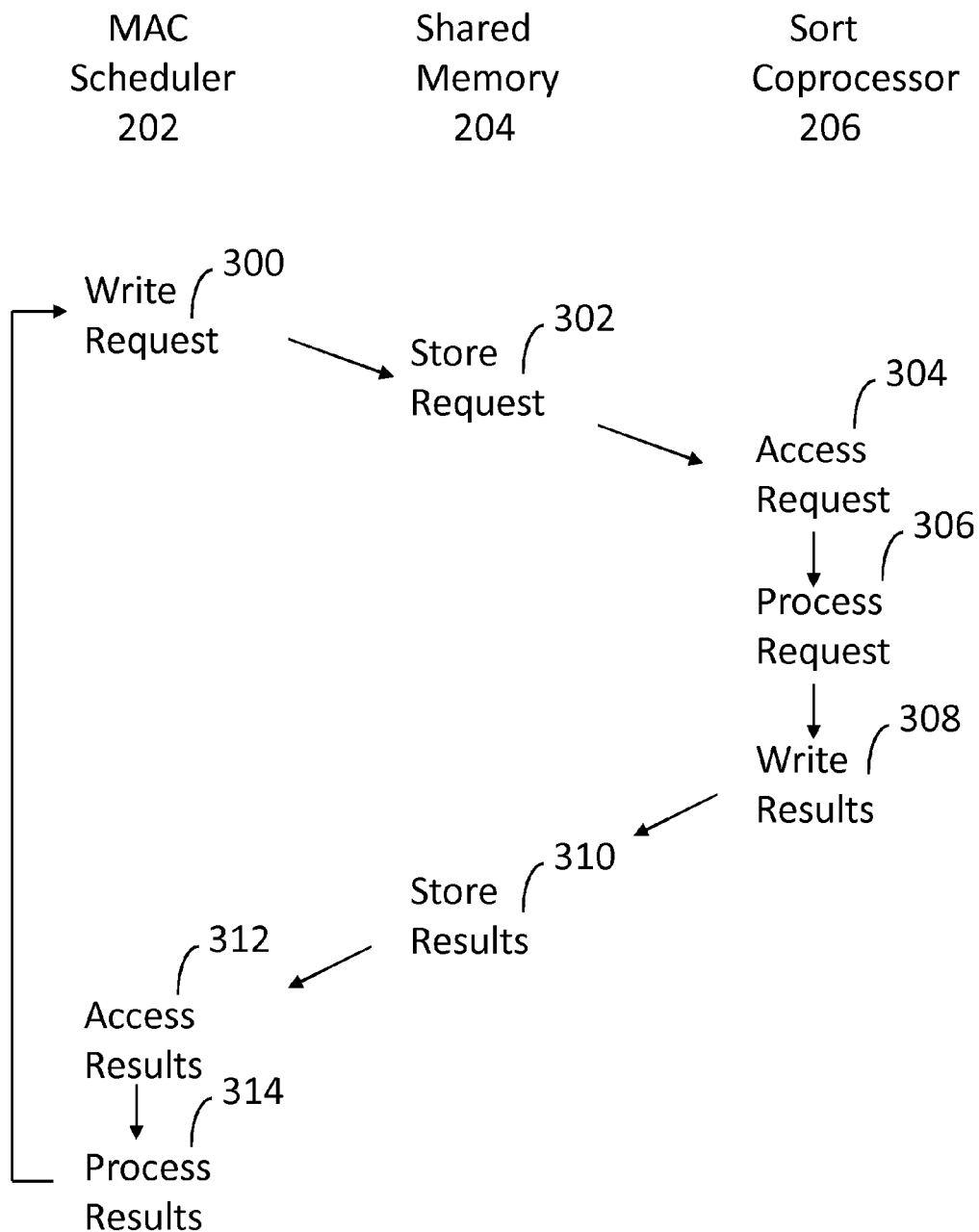
FIG. 3 illustrates processing operations performed in accordance with an embodiment of the invention.

FIG. 3 illustrates processing operations associated with an embodiment of the invention. In particular, the figure illustrates interactions between the MAC scheduler 202, shared memory 204 and sort coprocessor 206. In one embodiment, the scheduler processor 202 writes a request 300 to shared memory 204, which stores the request 302. In one embodiment, the write request specifies an address in a queue 200, a number of entries to assess in the queue, and a number of sorted elements to return.

The sort coprocessor 206 accesses the request 304, processes the request 306 and writes results 308. The sort coprocessor is a hardware resource that processes each request in accordance with user processing priority parameters. The sort coprocessor is configured to prioritize traffic based upon a priority parameter, which is computed based on several quality of service parameters (e.g., bit error rate, packet latency, service response time, packet loss, signal-to-noise ratio, etc.), channel conditions, wait-in-queue time, timing efficiency and the like.

The shared memory 204 stores the sorted results 310. The MAC scheduler 202 accesses the results 312 and processes the results 314. The sort coprocessor 206 may use a zero byte write to a specified location in shared memory 204 or use an interrupt to advise the MAC scheduler 202 of available results. Processing of the results may include loading the results into a media access control block that is assigned to a downlink channel 210. Control then returns to block 300.

The operations of the invention have been fully disclosed. The following disclosure relates to specific implementation details that may be utilized in accordance with certain embodiments of the invention. Each MAC scheduler 202 allocates down link and up link radio resources to each mobile device based upon quality of service requirements. The priority of each user device may be a function of time (e.g., the longer it waits in a queue 200 the higher its priority for the next scheduling iteration). For a given quality of service level, the MAC scheduler 202 searches the list of user devices waiting for air resources and tries to find the best suitable candidates for allocation of radio resources. Thus, sorting and selecting operations are repeatedly performed (e.g., every 1 msec). Candidates are selected based upon priority, which may be a weighted average of several constantly changing metrics (e.g., quality of service, channel conditions, wait-in-queue, etc.).

The foregoing operations may be implemented using an application program interface. The following documented code is an example of an application program interface that may be used in accordance with an embodiment of the invention.

scheduler performance. This facilitates the utilization of a lower number of processor (cores) required for MAC scheduler operation.

An embodiment of the present invention relates to a computer storage product with a computer readable storage medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs, DVDs and holographic devices; magneto-optical media; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using JAVA®, C++, or other object-oriented programming language and development tools. Another embodiment of the invention may be implemented in hardwired circuitry in place of, or in combination with, machine-executable software instructions.

```
        typedef octeon_sort_t; /*Octeon refers to a processor sold by Cavium
Networks, Inc.*/
{
   uint8_t key[4];
   uint8_t context_pointer[8];
} OCTEON_SORT_T;
typedef octeon_sort_instruction_t
    {
        Uint8 data_type;      /* float or integer */
        Uint8 sort_type;      /* ascending or descending order */
        Uint8 response_type   /* specifies how coprocessor should notify scheduler about
      completion, e.g., interrupt or zero-byte write */
        uint32 address;       /* pointer or address to do zero-byte write */
        uint32 response_address; /* starting address location where SORT unit would write
results to */
} OCTEON_SORT_INSTRUCTION_T;
int octeon_sort_submit (
        OCTEON_SORT_T *octeon_sort_input_array,
        int          numOfUsers,
        int          maxNumUsersToSelect,
    OCTEON_SORT_INSTRUCTION_T *octeon_sort_params);
octeon_sort_input_array:    /*pointer to input OCTEON_SORT_T list*/
numOfUsers:                 /*number of input elements to sort*/
maxNumUsersToSelect:        /*number of output selected and sorted elements*/
Octeon_sort_params:         /*various parameters for control, input and
                              output info needed by SORT engine*/
```

Thus, various parameters may be used to control the sort operations. In the foregoing example, data type is specified (i.e., floating point or integer), sort order (i.e., ascending or descending) is specified and response parameters are specified (i.e., response type and memory address information). The foregoing code also specifies a number of entries to consider and a number of entries to return. The last line of code indicates that sort parameters may be passed to the coprocessor 206. Thus, the coprocessor 206 may utilize specified user priority parameters that are pre-existing and/or passed to the coprocessor 206 in connection with a request for sorted results.

Those skilled in the art will appreciate that media access control scheduling is a critical function performed by base stations. The sort coprocessor 206 helps improve MAC The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. An apparatus, comprising:
    a Media Access Control (MAC) scheduler that generates a sort request;
    a hardware based sort coprocessor that services the sort request in accordance with specified packet processing priority parameters to generate a sorted array, wherein the hardware based sort coprocessor is configured to prioritize traffic based upon a priority parameter based on quality of service parameters, channel conditions, wait-in-queue time and timing efficiency;
    a shared memory separate from and accessible by each of the MAC scheduler and the hardware based sort coprocessor, wherein the MAC scheduler generates a sort request that is written to the shared memory, wherein the sort request references a sort list, a number of elements to sort and a maximum number of sorted elements to return; and
    the hardware based sort coprocessor accesses the sort request from the shared memory and operates to service the sort request.

2. The apparatus of claim 1 wherein the sorted array comprises sorted users for a mobile wireless communication system.

3. The apparatus of claim 1 wherein the sort coprocessor accesses a sort input array.

4. The apparatus of claim 1 wherein the MAC scheduler processes the sorted array to produce down link channel communications.

5. The apparatus of claim 1 wherein the sort coprocessor writes the sorted array to the memory and the MAC scheduler reads the sorted array from the memory.

6. A network node, comprising:
    Layer-1 functional blocks;
    Layer-2 functional blocks including
        a Media Access Control (MAC) scheduler program executed on a processor that generates a sort request, and
        a hardware based sort coprocessor that services the sort request in accordance with specified packet processing priority parameters to generate a sorted array, wherein the hardware based sort coprocessor is configured to prioritize traffic based upon a priority parameter based on quality of service parameters, channel conditions, wait-in-queue time and timing efficiency,
        a shared memory separate from and accessible by each of the MAC scheduler and the hardware based sort coprocessor, wherein the MAC scheduler generates a sort request that is written to the shared memory, wherein the sort request references a sort list, a number of elements to sort and a maximum number of sorted elements to return, and
        the hardware based sort coprocessor accesses the sort request from the shared memory and operates to service the sort request.

7. The network node of claim 6 wherein the MAC scheduler processes the sorted array to produce media access control blocks.

8. The network node of claim 6 wherein the hardware based sort coprocessor writes the sorted array to the memory and the MAC scheduler reads the sorted array from the memory.

* * * * *